United States Patent
Ragland et al.

[11] Patent Number: 5,939,212
[45] Date of Patent: Aug. 17, 1999

[54] FLEXIBLE CORRUGATED MULTILAYER METAL FOIL SHIELDS AND METHOD OF MAKING

[75] Inventors: G. William Ragland, Dunwoody, Ga.; Raymond E. Ragland, Union, Mo.; Christopher V. Ragland, Duluth, Ga.

[73] Assignee: ATD Corporation, St. Louis, Mo.

[21] Appl. No.: 08/871,771

[22] Filed: Jun. 9, 1997

[51] Int. Cl.⁶ .............. B32B 3/28; B32B 15/01; B21D 13/00; B21D 39/02
[52] U.S. Cl. .......... 428/594; 428/603; 428/604; 72/363; 72/379.2; 72/379.6
[58] Field of Search .................. 428/594, 593, 428/603, 604; 72/379.2, 379.6, 363

[56] References Cited

U.S. PATENT DOCUMENTS

| | | | |
|---|---|---|---|
| 1,934,174 | 11/1933 | Dyckerhoff | 154/28 |
| 1,987,798 | 1/1935 | Ruppricht | 154/45 |
| 2,045,733 | 6/1936 | Spafford | 154/45 |
| 2,180,373 | 11/1939 | Sibley et al. | 189/34 |
| 2,466,859 | 4/1949 | Northrup | 126/19 |
| 3,152,033 | 10/1964 | Black et al. | 161/50 |
| 3,354,021 | 11/1967 | Royet | 161/111 |
| 3,509,990 | 5/1970 | Piazze | 206/57 |
| 3,801,419 | 4/1974 | Meek | 161/44 |
| 3,966,646 | 6/1976 | Noakes et al. | 252/477 |
| 3,981,689 | 9/1976 | Trelease | 29/183 |
| 4,074,495 | 2/1978 | Bodnar | 52/613 |
| 4,099,928 | 7/1978 | Norback | 29/157.3 |
| 4,251,598 | 2/1981 | Waite | 428/603 |
| 4,337,565 | 7/1982 | Diana | 29/509 |
| 4,394,410 | 7/1983 | Osrow et al. | 428/43 |
| 4,559,205 | 12/1985 | Hood | 422/180 |
| 4,576,800 | 3/1986 | Retallick | 422/180 |
| 4,687,697 | 8/1987 | Cambo et al. | 428/201 |
| 4,794,052 | 12/1988 | Morrison | 428/595 |
| 4,810,588 | 3/1989 | Bullock et al. | 428/603 |
| 4,971,216 | 11/1990 | Fortune | 220/94 |
| 5,011,743 | 4/1991 | Sheridan et al. | 428/600 |
| 5,029,721 | 7/1991 | Timpe | 220/94 |
| 5,030,302 | 7/1991 | Jud et al. | 156/164 |
| 5,158,814 | 10/1992 | Foti | 428/592 |
| 5,196,253 | 3/1993 | Mueller et al. | 428/138 |
| 5,385,790 | 1/1995 | Atkinson et al. | 428/594 |
| 5,408,071 | 4/1995 | Ragland et al. | 219/530 |
| 5,424,139 | 6/1995 | Shuler et al. | 428/596 |
| 5,503,062 | 4/1996 | Buff, IV | 99/426 |
| 5,524,406 | 6/1996 | Ragland | 52/406.2 |
| 5,582,389 | 12/1996 | Greene | 249/61 |
| 5,633,064 | 5/1997 | Ragland et al. | 428/95 |
| 5,670,264 | 9/1997 | Sheridan | 428/604 |

FOREIGN PATENT DOCUMENTS

| | | |
|---|---|---|
| 1972-2049 | 12/1971 | Japan . |
| 1973-00209 | 6/1973 | Japan . |
| 1981-187651 | 12/1981 | Japan . |
| 1987-37518 | 3/1987 | Japan . |
| WO88/01722 | 3/1988 | WIPO . |
| WO94/11591 | 5/1994 | WIPO . |

*Primary Examiner*—John J. Zimmerman
*Attorney, Agent, or Firm*—Burns, Doane, Swecker & Mathis LLP

[57] ABSTRACT

A flexible corrugated multilayer metal foil structure comprising a stack of metal foil layers which are formed in corrugations extending across a stack of the metal foil layers, wherein all of the layers have the same corrugated pattern and shape as a result of the stack being shaped in corrugations or the layers being separately shaped in corrugations then nested into a stack. A portion of the corrugations of the stack of metal foil layers can be compressed to fold the layers together whereby the layers are interlocked together in overlapping relationship.

35 Claims, 3 Drawing Sheets

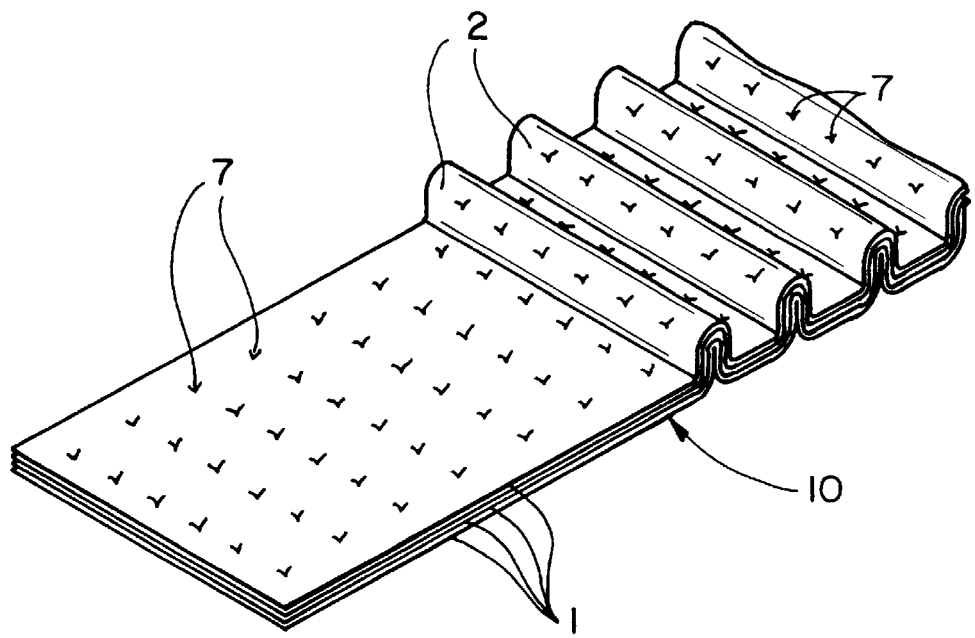
FIG_1
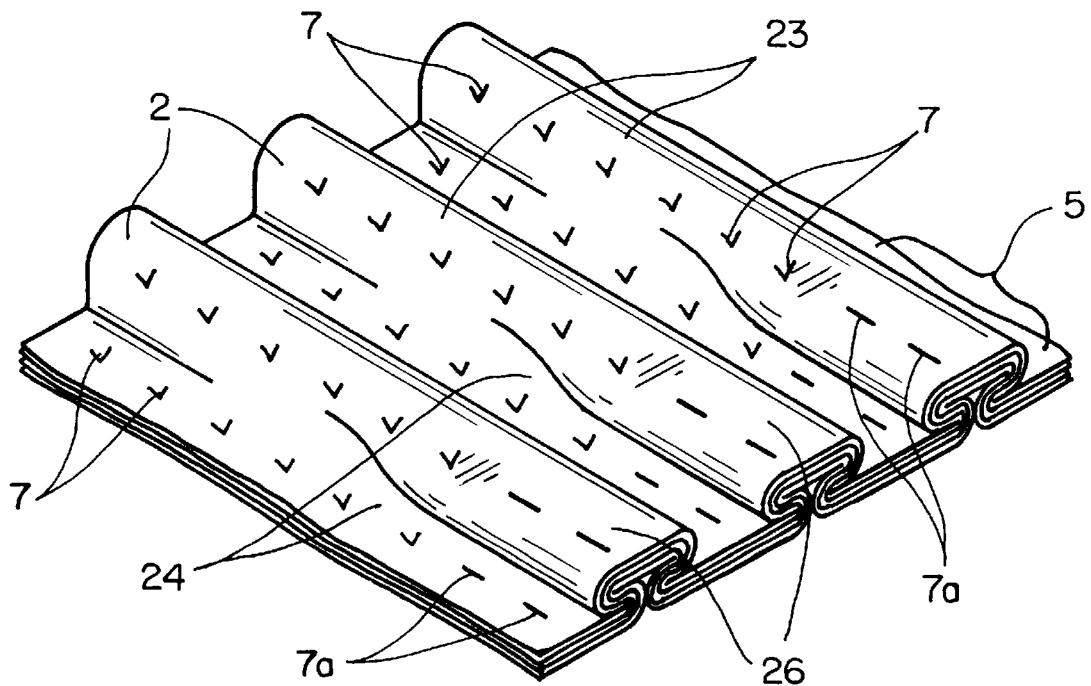
FIG_2

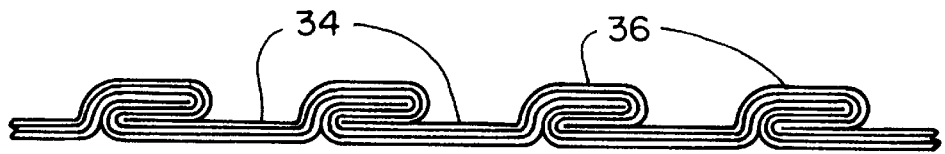
FIG_3
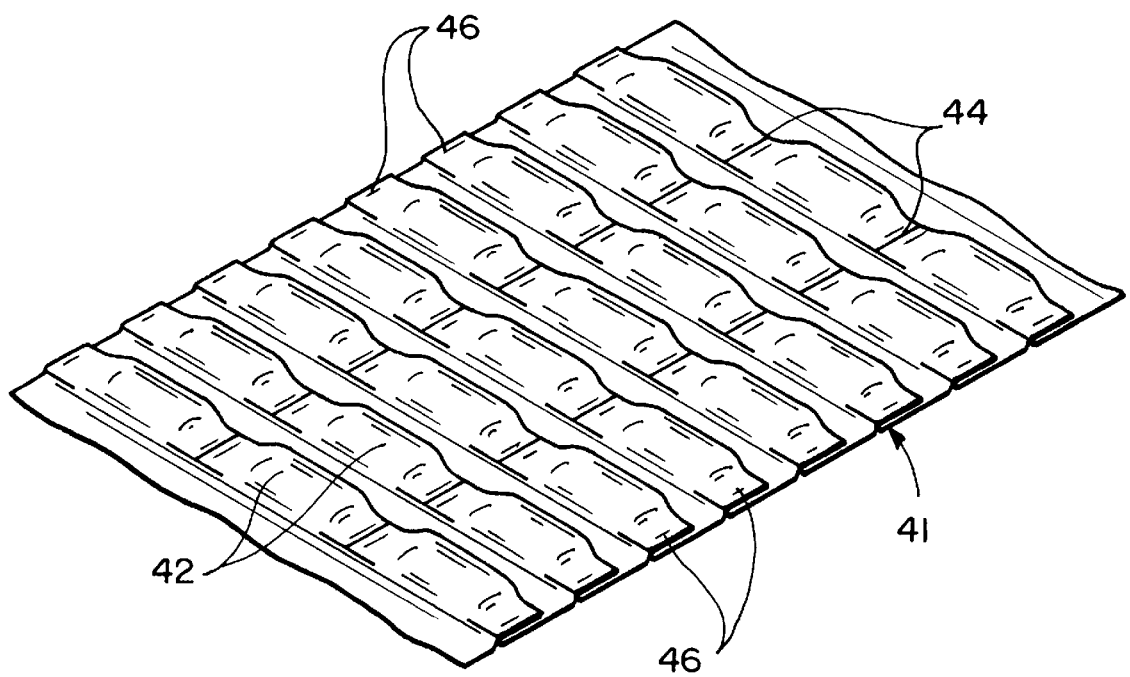
FIG_4

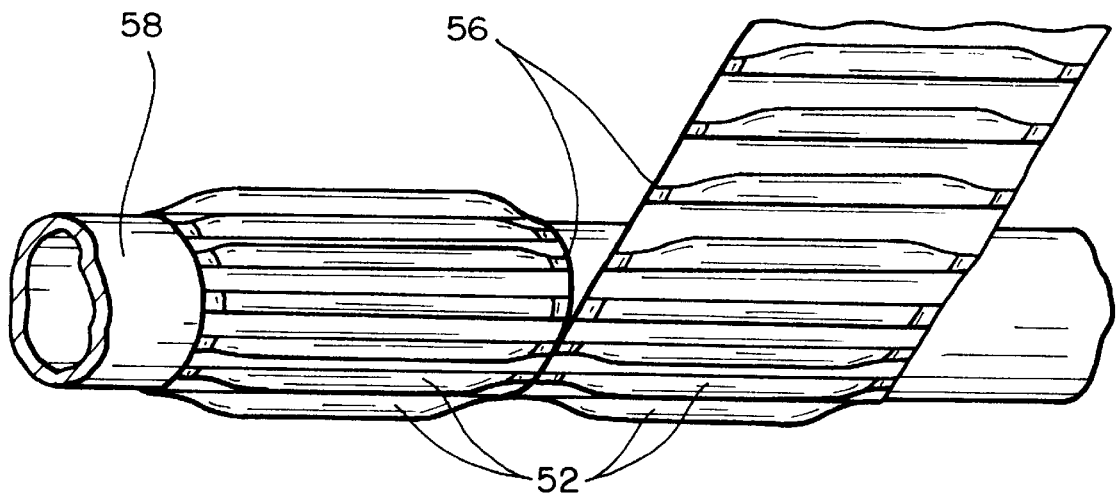
FIG_5
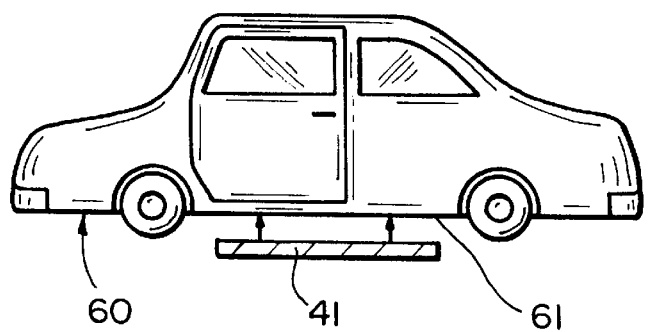
FIG_6

FLEXIBLE CORRUGATED MULTILAYER METAL FOIL SHIELDS AND METHOD OF MAKING

FIELD OF THE INVENTION

This invention relates to multilayer metal foil and metal sheet structures which have utility as heat shields and as acoustic shields.

BACKGROUND OF THE INVENTION

Multilayer metal foil insulation has been used for many years, as illustrated by U.S. Pat. No. 1,934,174. Such metal foil insulation has typically been used in high temperature applications for reflective heat insulation. In those applications, the layers of metal foils are embossed to provide separation between the layers, and the stack of layers are protected in a container or rigid cover to prevent the stack of metal foils from becoming compressed at any portion, which would decrease the heat insulation value of the stack.

U.S. Pat. No. 5,011,743, discloses that multilayer metal foil insulation can provide enhanced performance as a heat shield when a portion of the multilayer metal foil is compressed to provide a heat sink area through which heat is collected from the insulating portions of the stack and dissipated from the heat shield. Such multilayer metal foil heat shields are formed from a stack of embossed metal foil layers by compressing portions of the stack to create the desired heat sink areas. The layers are attached to each other or stapled together to prevent the layers from separating. The heat shields and acoustic shields formed according to the disclosure of the U.S. Pat. No. 5,011,743 are typically compressed in the heat sink areas and cut to a desired pattern. Such multilayer metal foil heat shields do not normally have sufficient structural strength for stand-alone use in many applications. For many applications, the metal foil heat shields are typically attached to a structural support member or pan to provide a final assembly which is then placed in service as a heat shield or acoustic shield. The support members are typically metal pans, metal stampings or metal castings. Typical applications for such heat shield assemblies include automotive heat shield applications.

The disclosures of the above patents are incorporated herein by reference.

SUMMARY OF THE INVENTION

It is an object of this invention to provide a multilayer metal foil insulation structure which is flexible and suitable for use in heat shield and acoustical shield applications.

The flexible corrugated multilayer metal foil structure according to this invention comprises a stack of metal foil layers which are formed in corrugations extending across a stack of the metal foil layers, wherein all of the layers have the same corrugated pattern and shape as a result of the stack being shaped in corrugations or the layers being separately shaped in corrugations then nested into a stack. A portion of the corrugations of the stack of metal foil layers is compressed to fold the layers together whereby the layers are interlocked together in overlapping relationship. The resulting multilayer corrugated interlocked structure is flexible by means of the ability of the multilayer corrugated interlocked structure to flex along the valleys or peaks of the corrugations where they are not compressed and folded and along the valleys between the corrugations where the peaks of the corrugations are compressed and folded to interlock the layers together. Depending on the thickness of the layers, number of layers and the degree of compression of the interlocked layers, the compressed portions of the corrugations can also flex along with the uncompressed portions of the interlocked structure.

The flexible corrugated multilayer metal foil structures of this invention comprise at least three metal layers at least two of which are metal foil layers having a thickness of 0.006 in. (0.15 mm) or less. It is generally preferred that the flexible corrugated multilayer structures of this invention contain at least three layers of metal foil and more preferably will typically contain five or more layers of metal foil. Preferably, the metal foil layers will be 0.005 in. (0.12 mm) or less, with 0.002 in. (0.05 mm) metal foil being a preferred thickness, especially for the interior layers of the flexible corrugated multilayer metal foil structure. In addition to the layers of metal foil, optional protective exterior layers of metal sheet on one or both sides of the flexible corrugated multilayer structure can be included. Such metal sheets have a thickness greater than 0.006 in. (0.15 mm) and up to about 0.050 in. (1.27 mm). The thickness of the optional exterior protective metal sheet is selected such that it can be corrugated into the same shape and pattern as the other layers (either separately then nested, or simultaneously corrugated as part of the stack) and compressed into interlocking engagement with the other layers as part of the unitary multilayer metal foil structure according to this invention. Preferably, the protective exterior metal sheet layer will be between about 0.008 in. (0.20 mm) and about 0.030 in. (0.76 mm). One preferred flexible corrugated multilayer metal foil structure according to this invention is made entirely of metal foils each having a thickness of 0.006 in. or less without the use of heavier external sheet layers.

One or more of the individual metal foil layers comprising part of the multilayer structure of this invention may be embossed or contain other spacers to provide spaces and gaps between the layers. Even though some of the embossments or gaps may be reduced during the formation of the corrugations of the multilayer stack and some may be entirely eliminated in those areas where the corrugations are compressed to form the folds interlocking the layers together, the residual spaced apart gaps between the layers in various parts of the multilayer corrugated structure is advantageous in many applications with respect to the heat and acoustic insulating and shielding properties. However, without embossments or other spacers to hold the layers apart, the metal foil layers will inherently have some gaps and spaces between the layers due to wrinkles or other deformations that inherently occur during the formation of the corrugations of the multilayer metal foil structure. In addition to spacers in the form of embossments or wrinkles in the layers themselves, separate spacers may be used to provide gaps between the layers, such as compressible foil pieces or mesh, or non-compressible materials, so long as the presence of such spacers does not interfere with the compression and folding of the corrugations together at desired locations in the structure to interlock the layers and prevent separation of the layers when the multilayer metal foil structure is used for its intended use.

The flexible multilayer corrugated metal foil structures of this invention, when formed with corrugations across the stack of layers, are rigid or at least resist bending in one direction but are flexible in the other direction due to the ability of the stack to flex along the peaks and/or valleys of the corrugations. This flexibility of the multilayer corrugated structure enables application thereof as heat and sound shields to contoured shapes, especially curved planar surfaces such as conduits. However, the multilayer corrugated structures of this invention can also be fitted or formed into or onto any shape desired by flexing the multilayer structure in one direction along the corrugations and by bending, creasing or buckling the corrugation ridges to shape the structure in the other direction across the corrugations. In addition, the spacing of the corrugations can be laterally stretched out or compressed together to assist in shaping the multilayer corrugated metal foil structure to fit desired three dimensional shapes. For example, a shield can be formed to a desired shape by forming the corrugations in the stack of metal foil layers, shaping the stack including stretching or compressing the corrugations laterally (along the plane of the layer) as needed for shaping, then compressing the corrugations vertically where desired to fold the corrugations and interlock the layers together.

In an optional structure, the corrugated multilayer metal foil structure of this invention can be made flexible in the other direction by compressing creases across the corrugations, whereby the creases are compressed deeply enough into the corrugations to provide the bending and flexing of the multilayer structure along those creases. It will be recognized that in the formation of such creases to provide additional flexibility to the corrugated multilayer metal foil structure of this invention, the compression to form the creases will also provide the additional function of folding the corrugated layers and interlocking the layers together with one another in the same fashion as the above described vertical compression of the corrugations to interlock and prevent separation of the layers. This folding and interlocking of the layers by the creasing can be in addition to or instead of the first compression of the corrugations mentioned above to fold and interlock the layers. Such creases can be any desired width, from a knife-edge sharp crease to wide flattened strip across the corrugations, and can be any desired direction across the corrugations depending on the flexibility and the heat or sound shielding properties desired in the final product.

The present invention provides a method of forming a flexible corrugated metal foil structure by first providing a stack of metal foils. Each metal foil layer optionally may be individually embossed, wrinkled, corrugated (for example, very small corrugations in period or height compared to the main corrugations of the multilayer product) or contain other spacers to provide gaps between the layers. The stack of metal foils is then shaped as a unitary structure into corrugations, which may be done using conventional metal corrugating methods and equipment. After the corrugations are formed in the multilayer stack, a portion of the corrugations are compressed to fold the layers over each other whereby the layers are interlocked together. The interlocking of the layers prevents separation of the layers while retaining the flexibility of the multilayer metal foil corrugated stack along the corrugations by flexing along the peaks and valleys or channels of the corrugations. The portion of the corrugations which are compressed in order to fold and interlock the layers may be any portion or area of the corrugations desired for a particular product, but sufficient to prevent separation of the layers during handling and use. For example, in many applications it will be preferred that the edges of the corrugated stack be compressed whereby the metal foil layers are folded and interlocked around the perimeter or along at least one edge of the multilayer corrugated metal foil stack. Other configurations may be desirable depending on end use of the multilayer metal foil structure. For example, it may be desired to compress an interior portion of the corrugations in a strip parallel with the edge of the multilayer strip whereby the layers are folded and interlocked together in an interior portion of the corrugated multilayer metal foil structure leaving the edges uncompressed in the corrugated configuration. Alternatively, it may be desired to substantially compress periodic or alternating corrugations along all or most of the length of each individual corrugation, whereby a certain proportion of the corrugations are compressed to fold and interlock the layers together while the entire length of other corrugations remain uncompressed.

The shape of the corrugations can be selected by one skilled in the art depending on the desired properties of the structure. For example, the corrugations may be sinusoidal, square, rectangular, semicircular or other appropriate corrugation shape. The size, height, width and spacing of the corrugations can be uniform and regular, or can be nonuniform and irregular, so long as the corrugations are designed so that when the selected portion of the selected corrugations are compressed, the layers will readily fold and interlock together as a result of the compression of the corrugations. Similarly, the shape of the folds into which the layers are deformed and locked together can be selected and designed depending on the interlocking properties desired in the final flexible corrugated multilayer metal foil product produced according to this invention.

The flexible multilayer metal foil structures of the present invention have a wide range of utilities, but are preferred for heat and acoustical shielding applications, particularly in automotive use. The flexible multilayer metal foil structures of this invention have utility as heat insulating materials, but are preferred for use in heat shielding applications for spreading and dissipating heat from point sources of heat, or hot spots. Due to the high lateral conductivity of the multiple metal layers, heat can be efficiently conducted laterally from a hot spot to other locations within the flexible multilayer metal foil structure where the heat can be absorbed by or dissipated into surrounding environment where the temperature is lower than in the area of the hot spot heat source. It will be expected that in the corrugated multilayer metal structure according to the present invention, heat will be most readily and rapidly conducted along the shortest conductive path, which is along the length of the channels of the corrugations. Heat will be conducted more slowly in the direction transverse to the corrugation channels, i.e., along or across the peaks and valleys of the corrugations. Heat will also be conducted more rapidly along the paths resulting from the compressed areas and the creased areas referred to above, where the peaks and valleys of the corrugations have been essentially flattened. Given these properties, one can readily design corrugated multilayer metal foil heat shielding structures according to the present invention to shield and insulate hot spot sources of heat by conducting and dissipating the heat laterally along the corrugations in desired and specific directions. Similarly, the flexible multilayer metal foil structures of this invention have utility as acoustical shields due to the vibration and sound absorbing properties of the corrugated multilayer metal foil structure. For acoustic applications, it will be apparent to one skilled in the art that it may be desirable to have alternate material layers in between the corrugated metal layers. Materials such as plastic films, adhesives, fibers and other materials may be used to enhance the acoustic damping properties of the multilayer corrugated metal foil structure, although some of those alternate materials may not be suitable for use in some heat insulation or heat shielding applications.

The corrugated multilayer metal foil structure of this invention provides two advantages for utilization of the structure in various heat and acoustic shielding and insulating applications. First, the flexibility provided by the corrugations provides convenience in positioning the flexible corrugated multilayer metal foil structure of this invention in desired applications. As will be recognized, the additional flexibility by providing the above-referenced longitudinal creases across the corrugations provide additional flexibility, or the preforming the corrugated stack of metal foil layers before interlocking the layers together, will enable one to utilize the structures of this invention where various shapes of heat or acoustic shielding are required. The second property provided by the corrugated multilayer metal foil structure of this invention is the surprisingly high vertical strength and load bearing capability of the flexible corrugated multilayer metal foil structure formed according to this invention. After the selected portions of the corrugations are compressed to form the folding and interlocking of the layers together, the remaining uncompressed portions of the corrugations will support vertical loads and exhibit resistance to compression higher than one would expect for metal foils. Such load bearing properties make the flexible corrugated multilayer metal foil structures of this invention particularly useful as heat and acoustic shields under the carpet in passenger compartments of vehicles. The corrugated multilayer metal foil structures according to this invention may be positioned between the floor pan of an automobile and the passenger compartment carpet to absorb and dissipate heat from hot spot sources underneath the floor pan, such as a catalytic converter or exhaust systems, and to absorb and dampen noise, such as road noise. The corrugated shape of the multilayer metal foil structures of this invention provides sufficient resistance to compression and crushing under the carpet to enable the corrugated metal foil structure to maintain its corrugated shape and its heat and acoustic shielding properties under ordinary usage where vertical loads are applied to the corrugated multilayer metal foil structures by passengers stepping on the carpet.

It will be recognized by one skilled in the art that the flexible corrugated multilayer metal structures according to this invention can be formed with metal sheets having thicknesses greater than 0.006 in. and without the use of metal foil layers having a thickness of 0.006 in. or less. Such flexible corrugated multilayer metal sheet structures are formed in the same way as the multilayer metal foil structures and may be desirable for additional strength and vibration resistance in certain end use applications.

BRIEF DESCRIPTION OF THE DRAWINGS

FIG. 1 is a perspective view of a multilayer metal foil stack which is formed into corrugations.

FIG. 2 is a partial perspective view of an edge portion of the stack of corrugated metal foils illustrating the compressed corrugations whereby the layers are folded and interlocked together.

FIG. 3 is a cross section view of an alternate shape of the folding and interlocking of the layers by compression of the corrugations.

FIG. 4 is an illustration of additional creasing of the corrugations to provide flexibility in the longitudinal direction across the corrugations, as well as the lateral direction along the corrugations.

FIG. 5 is a perspective view illustration of a diagonally embossed multilayer metal foil strip utilized for conduit insulation.

FIG. 6 is an illustration of the application on the corrugated multilayer metal foil structures of this invention to a vehicle.

DESCRIPTION OF THE INVENTION

This invention adapts metal sheet corrugation forming processes to provide novel flexible, corrugated multilayer metal foil and metal sheet structures. Conventional metal corrugation forming processes, such as disclosed in U.S. Pat. Nos. 3,966,646 to Noakes et al. and 4,810,588 to Bullock et al., incorporated herein by reference, may be adapted for use in forming the corrugations utilized in the multilayer metal foil structures of this invention. While Bullock et al. is directed to non-nesting corrugated metal foil layers, it is apparent that the corrugation processes similar to Noakes et al. and otherwise known in the art can be adapted to form the corrugations in the multilayer metal foil structures of the present invention. In the practice of the present invention, it is preferred that a stack of metal foils and metal sheets first be provided in the desired number of layers, wherein the layers may contain embossments or other spacers for providing desired gaps or separation between the layers. The stack of metal foils is then corrugated as a unitary structure to form corrugations in all of the layers of the stack simultaneously. The corrugated stack of metal foils is then subjected to compressing selected areas or portions of the corrugations to cause the layers in the stack to fold over each other and interlock together as the corrugations are compressed to an essentially flattened condition in the selected areas. The resulting product provided by this invention is a multilayer metal foil structure wherein all of the layers are folded and interlocked together in those compressed portions of the corrugations, which holds the entire structure together, and the multilayer metal foil structure remains flexible due to the bendability in the areas of the peaks and/or valleys of the corrugations.

In an alternative method of forming the structures of the present invention, individual metal foil layers and metal sheet layers may be corrugated separately, then stacked together and nested as a stack of pre-corrugated individual sheets. The corrugations can be regular or irregular in shape, period, etc., so long as each of the sheets will substantially nest with the other sheets to enable the compression and folding of the stack of corrugations for the interlocking of the layers together. The nested stacks of corrugated sheets can then be subjected to compression of portions of the corrugations to fold and interlock the layers together to form the corrugated multilayer metal foil structures of this invention. One or more of the individual layers may be embossed or otherwise dimpled, crinkled, corrugated (in a non-nesting direction or pattern different than the adjacent layers) or otherwise topographically contoured in order to provide gaps and spacing between the layers. When metal foils are provided with such embossments or spacers to provide gaps, it will be recognized that a portion of the embossments or spacers will usually be eliminated or at least diminished during the corrugation process to form the corrugated multilayer metal foil structure according to this invention. It will also be recognized that when portions of the corrugations in multilayer preform stacks are compressed to fold and interlock the layers together, the embossments or other spacers may be substantially or entirely eliminated in those compressed areas. However, in many applications it may be desirable to provide such embossments or spacers to form gaps between the layers, because gaps between the layers in the corrugated areas, which are not compressed and interlocked together, generally enhance the heat and sound insulating and shielding properties of the flexible corrugated multilayer metal foil structures of this invention.

This invention is further illustrated by reference to the drawings. FIG. 1 illustrates a stack (10) of metal foil sheets (1) which are corrugated in the form of a stack of sheets to form corrugations (2) laterally across the stack of sheets. One or more of the sheets can have optional embossments (7) preformed therein to provide preferred gaps or separation between the layers of sheets (1). The corrugations can be designed and selected to have any shape, sinusoidal, semicircular, square, rectangular, etc., which is appropriate to provide useable corrugations which can be compressed to fold and interlock the metal sheets together as provided by this invention. The height of the corrugations and the period or distance between the corrugations likewise can be selected by one skilled in the art depending on the properties desired in the final products and depending on the economics and equipment available for forming the corrugations in the stack. The corrugations can be formed in the stack of metal sheets by conventional metal corrugating methods and equipment, such as illustrated in U.S. Pat. No. 3,966,646 referred to above. It will also be recognized by one skilled in the art that each sheet can be corrugated separately, then the corrugated sheets stacked and nested to form the stack of corrugated metal sheets useful in this invention. Similarly, one can form a stack of metal foils, such as four layers of 0.002 in. metal foils and corrugate that stack of metal foils. Separately, one can corrugate a single cover sheet such as a 0.010 in. thick sheet then place the corrugated cover sheet on and nest the cover sheet with the stack of corrugated metal foils to produce the corrugated multilayer metal foil stack useful in forming the structures according to this invention. It will also be recognized that it is not required or necessary in the corrugated multilayer metal foil and sheet structures of this invention for all layers to be nested throughout the structure. For interlocking of the layers by compressing stacks of corrugations, the layers need to be nested at those points, but it may be desirable to provide portions or areas of the structure where the corrugations in the layers do not nest. Such a configuration of the product of this invention may be desired where additional total height is desired for insulation values or other purposes.

FIG. 2 is a partial perspective view of the edge of the corrugated stack of metal sheets of FIG. 1 showing how the compression of the corrugations (2) folds and interlocks the layers together. In this illustration, the corrugations are compressed in edge area (5) into an omega (9) shape in areas (26) which folds the layers together and interlocks the layers in the stack. Other shapes of folds can be used, such as "T", "L" or mushroom shapes. This type of compression of the corrugations can be performed along the edge of the stack as illustrated or in an interior portion of the stack, or both, as desired to provide sufficient interlocking of the layers to prevent separation of the layers during use of the final product. FIG. 2 illustrates the optional embossments (7) remaining in the corrugated areas and providing separation of the layers and the flattened embossments (7a) in the area (5) where the corrugations have been compressed. Reference to FIG. 2 also illustrates the properties of the multilayer metal foil structure of this invention. The flexibility of the structure is provided by the multilayer corrugated interlocked structure being able to flex in transverse and longitudinal directions, such as along valleys (24) between corrugations (2) and at the peaks (23) of corrugations (22) due to the transition between the peaks and the flattened areas (26) of the corrugations can also flex to some extent when the structure is bent.

FIG. 3 illustrates in cross section view another shape of folding and interlocking of the layers together by the compression of a portion of the corrugations. The corrugations of the multilayer stack are compressed to form flattened areas (36) to fold and interlock the layers. Valley areas (34) remain between the compressed portions of corrugations and the uncompressed portions to provide flexibility of the final corrugated structure having interlocked layers. While two examples are shown, other shapes of folding and interlocking of the layers together to form the flexible integral structure according to this invention will be apparent to one skilled in the art following the disclosure herein.

FIG. 4 also illustrates an additional embodiment of the flexible corrugated multilayer structure of this invention wherein parallel corrugations (42) extending transversely across the stack of sheets are compressed at edge area (46) and are creased by longitudinally extending creases (44) which, together with corrugations (42), provide the ability of the multilayer structure to bend and flex along creases (44) or along the valleys between corrugations to provide additional shapability of the corrugated multilayer metal foil structure of this invention. Creases (44) can extend at any angle across the corrugations as desired for the flexibility and shapability to be designed into the product.

FIG. 5 illustrates additional embodiments of this invention wherein the corrugations (52) are formed at a right angle or at an oblique angle across the width of the stack of metal foils with the corrugations compressed at edge areas (56) to interlock the layers together. The angled configurations of the corrugated multilayer metal foil interlocked structure of this invention can wrapped in repeating sections (the right angle version) or can be spiral wrapped (the oblique angle version) around a hot, cold or cryogenic conduit (58) where the multilayer stack flexes at the valleys or peaks of the corrugations in the structure to facilitate the wrapping of the multilayer structure of this invention around a conduit and corrugations (52) are positioned parallel with the axis of the conduit.

FIG. 6 is a schematic illustration of the application of a shield illustrated in FIG. 4 to the underbody section of a vehicle (60). Shield (41) can be applied to the underneath surface of the passenger compartment pan or floor (61) by mechanical attachment or by adhesive attachment. It is also to be understood that a shield, such as shield (41) from FIG. 4 as well as any desired shape of corrugated multilayer metal foil shield, can be designed and formed according to this invention to fit any desired portion of the underbody of a vehicle, or the fire wall or other area of the engine compartment, etc. of a vehicle. The shields made according to the present invention are advantageously attached to the portions of the vehicle by adhesive or other mechanical attachment in order to provide an integral body or chassis part, because the efficient, light-weight, recyclable shields of this invention can be designed to provide a desired combination of heat shielding and acoustic shielding at any desired location on the vehicle. It is also to be recognized that the direct attachment by mechanical or adhesive attachment of the multilayer metal foil shields of this invention to the desired areas and components of a vehicle is enabled and made possible by the flexibility of the corrugated multilayer metal foil shields and parts made according to the teaching of this invention.

The compression of the corrugations to fold and interlock the layers together can be performed as desired by one skilled in the art. A preferred method and apparatus for compressing the corrugations is the use of a compression tool, such as a resilient, e.g., rubber or plastic, member which can compress the corrugations to fold the corrugations in the omega, "T", "L", mushroom or other shape to interlock the layers. One advantage of using a rubber compression member is that the corrugations are sufficiently compressed to fold and interlock the layers together but the compressed areas to remain somewhat more flexible than would occur if the compressions are flattened under more extreme pressure. Alternatively, metal, plastic, wood or other compression members may be used to accomplish the compression of the corrugations to fold and interlock the metal foil layers of the stack together. As referred to above in FIG. 4, the longitudinal creases which can be compressed across the corrugations to provide flexibility of the multilayer structure can likewise be formed using any desired method and compression member. As will be recognized by one skilled in the art the compression member may be a flat member, a V-shaped member or a knife edge type member, depending on the type of compression and, in the case of the longitudinal creases across the corrugations, the flexibility desired in the final product. The compressed portions of the corrugations to fold and interlock the layers together can be at any desired location or locations, such as at the edge of the multilayer structure or in an interior portion of the multilayer metal foil structure. As will be apparent to one skilled in the art, any combination or configuration of compressed areas to provide the appropriate folding and interlocking of the layers for a particular product design can be carried out following the teachings of this invention. The edge portion of the multilayer structure may be left open in the corrugated uncompressed condition when desired, and interior portions of the corrugations compressed to interlock the layers together. Alternatively, the edge portion in addition to being compressed can also be folded, rolled, curled, crimped or shaped in any desired pattern. A folded or crimped edge in some applications will be useful for providing a site for mounting hardware, when attaching the multilayer structure to, for example, the underbody of a vehicle. Thus, it is apparent that in addition to the compression of the corrugations to fold and interlock the layers, the layers may also be attached by other methods, such as stapled, clipped or bolted to other structural members for end use applications.

The materials useful in the corrugated stacks of this invention will likewise be apparent to one skilled in the art and will include typically aluminum, stainless steel, copper, similar metal foils and metal sheets, plastic coated metal foils and sheets, laminates of metals, alloys of these and other metals, and metallic materials which are plastically deformable and are permanently deformable. In addition to metal, other materials may be interlayered between two or more of the metal foil layers of the multilayer structure of this invention. For example, plastic films, adhesive layers, spray on adhesives, coatings, etc. may be included between the metal foil layers, particularly in acoustic applications where additional sound damping is desired. The thickness of the various metal and other layers employed will depend on the end use application. It is preferred that the multilayer structure be made primarily of metal foils having a thickness of 0.006 in. or less and in particular it is preferred that in, for example, a five layer structure, at least the three interior layers are thin metal foils, for example 0.002 in. thick metal foils. The exterior layers of an all-foil structure are frequently desired to be heavier metal foils of 0.005 in. or 0.006 in. in thickness. Likewise, when the exterior layers are desired to be protective layers, they may be metal sheets of 0.010 or even up to 0.050 in. in thickness. In this regard, it is also recognized that the flexible corrugated multilayer metal structures of this invention can be a non-foil structure made entirely of layers of metal sheets thicker than metal foils, i.e., metal sheets having thicknesses in excess of 0.006 in. For example, flexible corrugated multilayer metal structures according to this invention can be made using five layers of 0.010 in. thick metal sheets.

The number of layers and the thicknesses of each layer will be selected by one skilled in the art depending on the flexibility desired, the vertical strength required in the final corrugated flexible product, the capacity for lateral heat transfer, the requirements for sound damping, etc. The thickness of various metal foil layers will vary from 0.0008 to 0.006 in., with the 0.002 in. and 0.005 in. metal foils being preferred for many applications. When heavier sheets are used and in particular for the top sheets or protective exterior sheets, the metal sheets can have a thickness of greater than 0.006 in. up to about 0.050 in., with the preferred top sheets or exterior sheets having a thickness of 0.010 in. to about 0.030 in. Some examples of combinations of number of layers and thicknesses of the layers used in forming the flexible corrugated multilayer metal foil structures of this invention are: (in mils, 1 mil=0.001 in.) 10/2/2/2/5; 5/2/2/2/5; 8/2/2/2/4; 10/2/2/2/10; 5/2/2; 5/0.8/0.8/5; and 10/2/0.8/0.8/2/5. Examples of non-foil metal sheet structures are: 10/8/8/8; 30/10/10/10/30; 8/8/8; and 50/8/8/10. The materials useful in this invention are similar to those disclosed in copending patent application Ser. No. 08/871,275 filed Jun. 9, 1997, the disclosure of which is incorporated herein by reference.

The total thickness of the corrugated multilayer metal foil/metal sheet structures of this invention can be designed and selected by one skilled in the art to meet the requirements for heat or sound shielding. For example, a typical under carpet application can utilize a structure of 10/2/2/5 mil layers with corrugation heights to give the structure a total vertical thickness of about 3 mm to about 4 mm from the base to the top of the corrugations.

As discussed above, the flexible corrugated multilayer metal foil and metal sheet structures of this invention are useful for heat insulation and dissipation and acoustic shielding. In these applications the structures of this invention can be manufactured in any desired shape and configuration for any application desired. For example, these structures can be designed and adapted for use on hot exhaust conduits when wrapped as illustrated in FIG. 5; they can be made in large shaped sheets which will conform to the shape of the underneath side of a vehicle passenger compartment floor pan or can be made to conform to the shape of a vehicle fire wall. In these applications, the structures of this invention serve both to insulate and to laterally conduct and spread heat from hot spot heat sources to the cooler areas where it can be absorbed by or dissipated to the environment adjacent to the multilayer metal structures of this invention. The flexible corrugated multilayer metal foil structures of this invention likewise can be placed, as discussed above, under the passenger compartment carpet of vehicles to spread and dissipate heat from the areas where the exhaust and catalytic converter systems tend to heat the floor pan of the passenger compartment. Such applications also provide acoustic insulation as well. Attachment of the flexible corrugated multilayer metal structures of this invention will be apparent to one skilled in the art using ordinary mechanical attachments such as clips, bolts, screws and the like. Adhesive attachment, for example by mastic coatings, etc., is a preferred method for placing the structures of this invention on various vehicle or automotive applications, especially for underbody applications, e.g., on the bottom of the floor pan of the passenger compartment. The corrugated multilayer metal foil and metal sheet structures of this invention may also be laminated to or between other materials such as metal, fabric, plastic, etc., when desired in particular applications and service conditions. For example, the corrugated multilayer structures of this invention can have a smooth layer of metal foil or metal sheet or an embossed, non-corrugated metal foil or metal sheet on one or both sides of the structure, attached by adhesive or by mechanical attachment to provide desired structural strength or shielding properties. Other non-vehicle and non-automotive utilities for the structures of this invention will be apparent to one skilled in the art, such as liners for ovens, etc. In various acoustic end use applications, it may be desirable to form perforations in one or more layers in the structure to enhance the sound and vibration absorbing capacity of the structure. Such perforations can be formed in conjunction with embossments, for example a perforations can be made at the points of embossments in metal foils. Or, such perforations can be formed in rows along the top ridges of the corrugations in some or all the layers of the structure.

Other variations of the methods of making and the structures of the present invention as well as end use application designs will be apparent to one skilled in the art following the teachings of this invention.

We claim:

1. A flexible multilayer metal foil structure comprising:
   at least two layers of metal sheets wherein the layers are metal foil each having a thickness of 0.006 in. (0.15 mm) or less; wherein
   the two layers of metal sheets are corrugated and nested together in a stack; and
   a portion of the corrugations of the stack is compressed to form interlocking folds of the layers.

2. A flexible multilayer metal foil structure of claim 1 further comprising a third metal sheet corrugated, nested and interlocked with the two metal foil sheets.

3. The flexible multilayer metal foil structure of claim 2, further comprising a fourth metal sheet corrugated, nested and interlocked with the three metal sheets.

4. The flexible multilayer metal foil structure of claim 3, further comprising a fifth metal sheet corrugated, nested and interlocked with the four metal sheets.

5. A flexible multilayer metal foil structure according to claim 1 wherein the corrugations are compressed in creases across the corrugations, whereby the structure is flexible by bending of the corrugated stack at the creases.

6. A flexible multilayer metal foil structure according to claim 1 comprising spacers to provide gaps between the layers.

7. The flexible multilayer metal foil structure of claim 1, wherein the two metal layers are metal foil each having a thickness of 0.005 in. (0.125 mm) or less.

8. The flexible multilayer metal foil structure of claim 1, wherein the two metal layers are metal foil each having a thickness of 0.002 in. (0.05 mm) or less.

9. A method of making a flexible multilayer metal foil structure comprising:
   forming a stack of at least two layers of metal sheets wherein the layers are metal foil each having a thickness of 0.006 in. (0.15 mm) or less;
   forming corrugations across the stack of metal sheets whereby the corrugations in the layers are nested in the stack; and
   compressing a portion of the corrugations in the stack of metal sheets to form folds and interlock the layers together.

10. A method according to claim 9 wherein the stack comprises a third metal sheet.

11. A method according to claim 10 further comprising forming creases across the corrugations to provide flexibility of the structure by bending at the creases.

12. A method according to claim 10 wherein the stack comprises spacers to provide gaps between the layers.

13. A method according to claim 10, wherein the stack further comprising a fourth metal sheet.

14. A method according to claim 13, wherein the stack further comprising a fifth metal sheet.

15. A method according to claim 9 further comprising forming creases across the corrugations to provide flexibility of the structure by bending at the creases.

16. A method according to claim 9, wherein the two metal layers are metal foil each having a thickness of 0.005 in. (0.125 mm) or less.

17. A method according to claim 16, wherein the two metal layers are metal foil each having a thickness of 0.002 in. (0.05 mm) or less.

18. A method of making a flexible multilayer metal foil structure comprising;
   providing individual corrugated metal sheets;
   forming a nested stack of said corrugated metal sheets where the stack comprises at least three layers of metal sheets wherein at least two of the layers are metal foil each having a thickness of 0.006 in. (0.15 mm) or less; and
   compressing a portion of the corrugations in the stack of metal sheets to form interlocking folds of the layers.

19. A method according to claim 18 further comprising forming creases across the corrugations to provide flexibility of the structure by bending at the creases.

20. A flexible multilayer metal sheet structure comprising:
   at least two layers of metal sheets each having a thickness greater than 0.006 in. (0.15 mm); wherein
   the two layers of metal sheets are corrugated together in nested corrugations and a portion of the corrugations are compressed to form interlocking folds of the layers.

21. A flexible multilayer metal sheet structure according to claim 20 further comprising a third metal sheet corrugated, nested and interlocked with the two metal foil sheets.

22. A flexible multilayer metal sheet structure according to claim 20 comprising spacers to provide gaps between the layers.

23. A method of making a flexible multilayer metal sheet structure comprising:
   forming a stack of at least two layers of metal sheets each having a thickness of greater than 0.006 in. (0.15 mm);
   forming corrugations across the stack of metal sheets whereby the corrugations in the layers are nested in the stack; and
   compressing a portion of the corrugations in the stack of metal sheets to form interlocking folds of the layers.

24. A method according to claim 23 wherein the stack comprises a third metal sheet.

25. A method according to claim 23 further comprising forming creases across the corrugations to provide flexibility of the structure by bending at the creases.

26. A method of making a flexible multilayer metal sheet structure comprising;
   providing individual corrugated metal sheets;
   forming a nested stack of said corrugated metal sheets where the stack comprises at least two layers of metal sheets each having a thickness of greater than 0.006 in. (0.15 mm); and
   compressing a portion of the corrugations in the stack of metal sheets to fold the layers in the corrugations into interlocking engagement.

27. A method according to claim 26 wherein the stack comprises a third metal sheet.

28. A method according to claim 26 further comprising forming creases across the corrugations to provide flexibility of the structure by bending at the creases.

29. A multilayer metal foil structure comprising:
- at least two layers of metal sheets wherein the layers are metal foil each having a thickness of 0.006 in. (0.15 mm) or less; wherein
- the two layers of metal sheets are corrugated and nested together in a stack; and
- a portion of the corrugations of the stack is compressed to form interlocking folds of the layers.

30. A multilayer metal foil structure of claim 29 further comprising a third metal sheet corrugated, nested and interlocked with the two metal foil sheets.

31. A multilayer metal foil structure according to claim 29 wherein the corrugations are compressed in creases across the corrugations, whereby the structure is flexible by bending of the corrugated stack at the creases.

32. A multilayer metal foil structure according to claim 29 comprising spacers to provide gaps between the layers.

33. The multilayer metal foil structure of claim 29, wherein the two metal layers are metal foil each having a thickness of 0.005 in. (0.125 mm) or less.

34. The multilayer metal foil structure of claim 29, wherein the two metal layers are metal foil each having a thickness of 0.002 in. (0.05 mm) or less.

35. A method according to claim 10, wherein the two metal layers are metal foil each having a thickness of 0.002 in. (0.05 mm) or less.

* * * * *